1,921,976

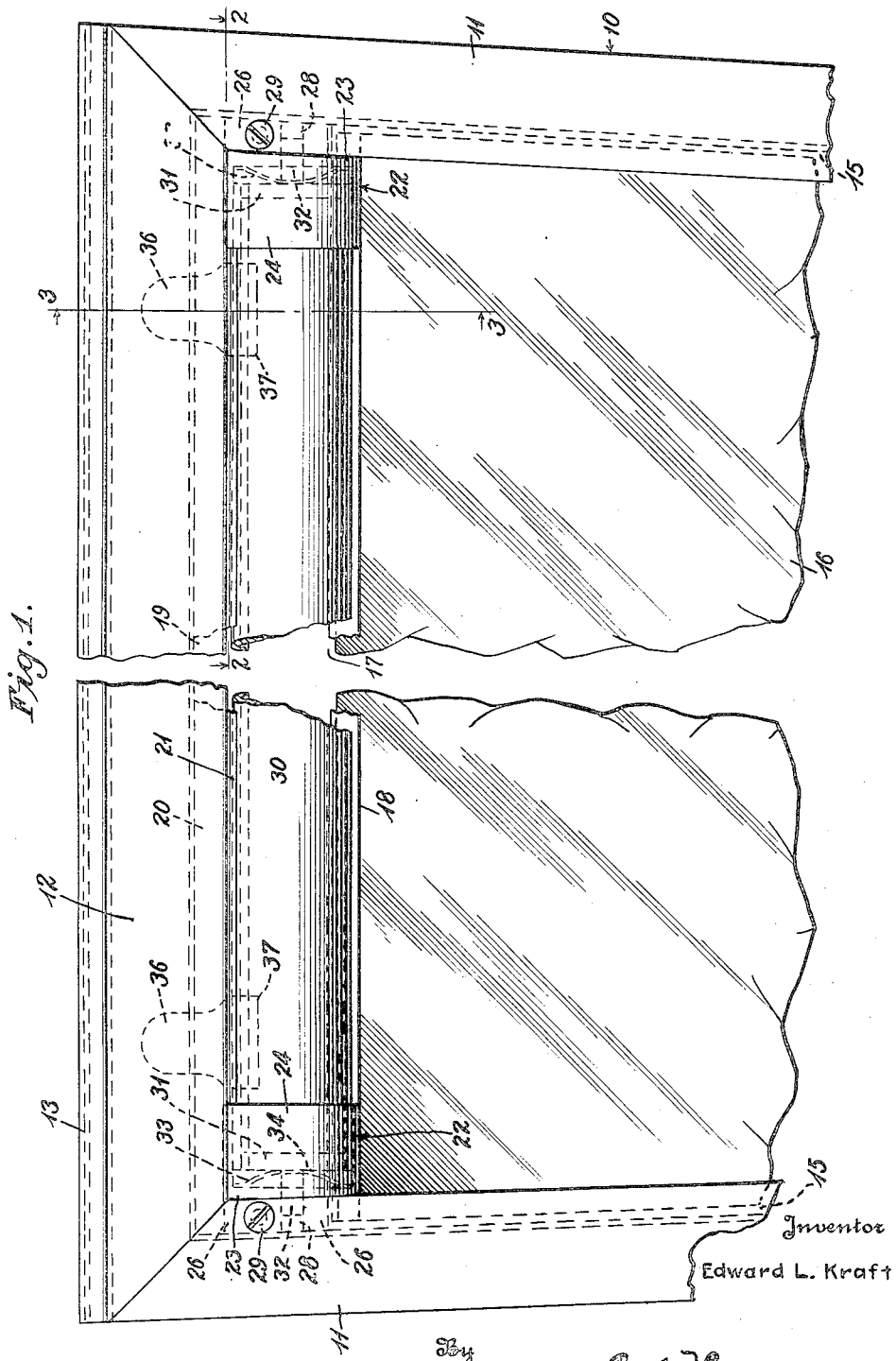

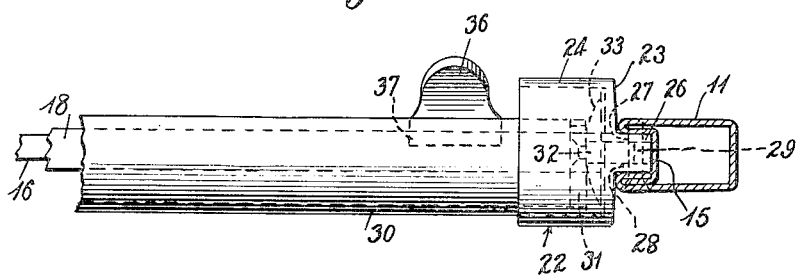
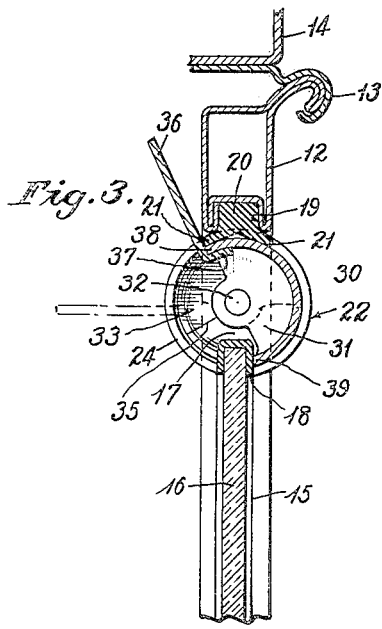
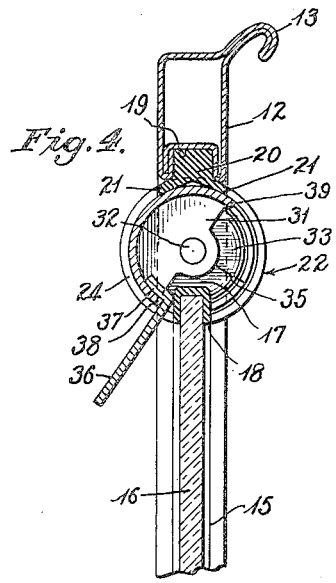
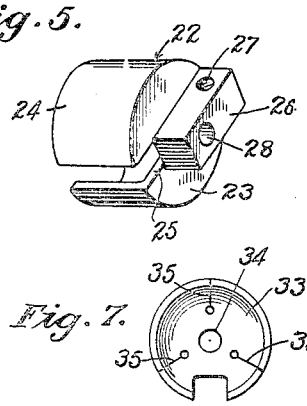
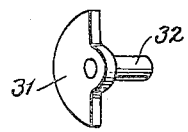
Inventor
Edward L. Kraft
By Bacon and Thomas
Attorneys Patented Aug. 8, 1933

UNITED STATES PATENT OFFICE 1,921,976

AUTOMOBILE VENTILATOR

Edward L. Kraft, York, Pa., assignor to Martin-Parry Corporation, York, Pa., a Corporation of Delaware Application September 16, 1931
Serial No. 563,185

15 Claims. (Cl. 296—94)

This invention relates to new and useful improvements in ventilators for automobiles.

The primary object of the invention is to provide a ventilator structure which may be incorporated in the conventional pivoted windshield section or sash of an automobile body.

A further object of the invention is to provide supporting means for a pivoted ventilator body, said means being designed for easy application to a pivoted windshield sash.

A still further object of the invention is to provide a ventilator of exceedingly simple construction and one which may be manufactured at a very low cost.

Other objects and advantages of the invention will be apparent during the course of the following description:

In the accompanying drawings forming a part of this specification and in which like numerals are employed to designate like parts throughout the same:

Figure 1 is a front elevational view of a windshield sash with the ventilator embodying this invention operatively associated therewith, Figure 2 is a fragmentary longitudinal sectional view taken on line 2—2 of Figure 1, Figure 3 is a fragmentary transverse sectional view taken on line 3—3 of Figure 1, Figure 4 is a similar view to Figure 3 but illustrates the ventilator body in a different operative position, and Figures 5, 6 and 7 are detail views of elements incorporated in the ventilator structure.

In the drawings, wherein for the purpose of illustration is shown a preferred embodiment of this invention, the numeral 10 designates in its entirety a windshield sash including end frame members 11, a top frame member 12, and a bottom frame member which is not specifically designated in view of the fact that this portion of the windshield does not specifically enter into the invention. The top frame member 12 is formed with a hinge portion 13 by means of which the windshield sash may be pivotally connected to the header 14 of the automobile body. The end frame members 11 are formed with channels 15 in which are fitted the opposite ends of the glass windshield panel 16. It will be noted that this windshield 16 terminates at its upper edge short of the top windshield frame member 12 so as to provide an elongated ventilating opening 17 which occurs between the upper edge of the windshield glass 16 and the lower edge of the top frame member 12. The top edge of the windshield glass is provided with a weatherstripping member 18, which may be formed of rubber or the like and is shaped to fit upon this edge of the glass. The top frame member 12 is formed with a channel 19 which receives a felt or rubber sealing strip 20. The exposed edge of this strip is formed with lips 21 which extend in opposite directions for a purpose to be described at a later point.

A cup-like bracket member 22 is provided for each end of the elongated ventilating opening 17. Each bracket includes an end plate 23 which has secured thereto an annular rim or edge flange 24. This rim or edge flange as well as the end plate are cut away at 25 to form a seat for the upper edge of the windshield glass 16 and the weatherstripping member 18. Each end bracket 22 is formed with a flange or integral boss 26 which projects beyond the end wall 23. This boss or flange is provided with a transverse, internally threaded aperture 27. A bearing opening 28 is provided and opens into the interior of the cup-like bracket member and through the outer face of the flange or boss 26.

In applying these bracket members to the windshield sash 10, the bosses or flanges 26 are fitted into the channel 15 formed in each end frame member 11 with the upper edge of the glass panel 16 received in the cut-out portion 25. A securing screw 29 is passed through one or both of the side walls of the channel 15 for securing the end bracket in place. As stated above, one of these brackets 22 is provided for each end frame member 11 of the windshield sash.

The ventilator body is of semi-cylindrical or trough formation and is designated by the reference character 30. Suitably secured to each end of this ventilator body 30 is a substantially semi-circular end plate 31. The end plates may be secured to the body of the ventilator by welding or any other suitable means. Each end plate is provided with a journal or pivot pin 32. In assembling the ventilator body with respect to the end brackets, the journals 32 are positioned within the bearing openings 28. The rim or edge flange 24 of each end bracket acts as a pocket for receiving an end of the ventilator body.

A dished, spring washer 33 is provided for each end of the ventilator body. Each spring washer is formed with a central aperture 34 to receive a journal 32. The slits 35 are provided to permit the washer to yield or be placed under suitable compression to cause the washer to act as a spring member. These spring washers are interposed between the ends of the ventilator body and the inner faces of the end walls 23 of the brackets 22. The spring washers function to center the ventilator lengthwise with respect to the end brackets and for frictionally retarding rotation of the ventilator body so as to maintain the latter in any desired adjusted position.

One or more handle members 36 is secured to the ventilator body by means of a tab 37 which fits inside the ventilator. This manner of associating the handle or handles with the ventilator body causes the outwardly projecting portions to traverse one longitudinal edge 38 of the ventilator body. It, therefore, will be noted that when the ventilator is arranged so that the handle or handles will contact with the rubber weatherstripping member 18, there will be left a space or opening between one longitudinal edge of the ventilator and the weatherstripping member 18. This space or opening occurs on the inner side of the windshield glass 16 and will cause a sheet of air to be directed downwardly over the inner face of the glass to prevent frosting or steaming of the latter. When in a fully closed position, the remaining longitudinal, straight edge 39 of the ventilator body will contact with the outer face of the weatherstripping member 18 to seal between the ventilator and the windshield glass. The ventilator body is positioned so that its outer surface will rub or wipe the lips 21 of the sealing strip 20 to prevent undersired passage of air, rain, or the like, between the ventilator body and the top frame member 12 of the windshield sash.

It is believed that the mode of operation and manner of assembling this ventilator will be readily understood by those skilled in the art. It might be stated, however, that this ventilator may be employed at such times when the occupant or occupants of a vehicle equipped with the same do not desire to ventilate the interior of the vehicle body by opening the pivoted windshield sash 10. The ventilator, therefore, acts more or less as an auxiliary ventilating means and will be positioned rather close to the top of the body so that it may be employed to direct a draft of air over the heads of the occupants of a vehicle.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In combination, a windshield sash, means for pivotally connecting the sash to a portion of the vehicle body, said sash including end frame members having glass receiving channels, a glass panel positioned within the sash with its end edges seated in said channels, said windshield glass terminating at one edge short of the adjacent portion of the windshield sash to provide a ventilating opening, supporting brackets having means fitting the channels in the end frame members of said windshield sash, and a ventilator body pivotally supported by said brackets.

2. In combination, a pivoted windshield sash, a windshield glass supported by the sash and having one edge terminating in spaced relation with respect to an adjacent portion of the windshield sash to provide a ventilating opening, a weatherstripping member carried by the edge of the windshield glass, a trough-shaped ventilator body pivotally connected to the windshield sash to control the passage of air or the like through said ventilator opening, and a handle member connected to the ventilator body and adapted to engage the weatherstripping member when the ventilator body is in one of its predetermined positions for directing a sheet of air over the inner surface of the windshield glass to prevent the accumulation of steam or the like upon the glass.

3. In combination, a pivoted windshield sash including channeled frame members, a windshield glass panel closing a portion only of the space defined by the frame members of said sash and being seated in some portions of the channels of said members, a ventilator for controlling the passage of air, or the like, through the remainder of said space, and means attached to some of said channeled frame members for pivotally supporting said ventilator.

4. In combination, a pivoted windshield sash including channeled frame members, a windshield glass panel closing a portion only of the space defined by the frame members of said sash and being seated in some portions of the channels of said members, a ventilator for controlling the passage of air, or the like, through the remainder of said space, and means including portions received in the channels of some of said frame members for pivotally supporting said ventilator.

5. In combination, a pivoted closure member having channeled marginal parts, a glass panel having edge portions received in the channels of some of said parts and having a free edge spaced from another of said channeled marginal parts to provide a ventilating opening in the closure member, a ventilating body pivotally mounted in the closure member to control the passage of air through the ventilating opening, and a sealing strip mounted in the channel of the said marginal part which is spaced from the free edge of the glass, said strip having contact with the ventilating body.

6. In combination, a pivoted closure member having channeled marginal parts, a glass panel having edge portions received in the channels of some of said parts, and having a free edge spaced from another of said marginal parts to provide a ventilating opening in the closure member, a ventilating body for controlling the passage of air through the ventilating opening, supporting brackets for said body having mounting flanges received in the channels of the marginal parts at the opposite ends of said opening, and a sealing strip carried by the marginal part which is spaced from the free edge of said glass and contacting with the ventilating body.

7. In combination, a pivoted closure member including channeled frame parts, a glass panel closing a portion only of the space defined by the frame parts and being seated in some portions of the channels of said parts, a ventilator for controlling the passage of air through the remainder of said space, and means attached to some of said channeled frame parts for pivotally supporting said ventilator.

8. In combination, a pivoted closure member including channeled frame parts, a glass panel closing a portion only of the space defined by the frame parts, and being seated in some portions of the channels of said parts, a ventilator for controlling the passage of air through the remainder of said space, and means including portions received in the channels of some of said frame parts for pivotally supporting said ventilator.

9. Mounting means for one end of a pivoted ventilator body comprising a support having an exposed channel, a bracket member having a projection positioned in the channel, means for fastening the projection in the channel, bearing opening in the projection, and a ventilator body end having a journal received in said bearing opening.

10. Mounting means for one end of a pivoted ventilator body comprising a support having an exposed channel, a glass panel having an edge received in a part of said channel, a cup-like bracket having a part of its wall cut away to accommodate said panel, and a projection positioned in the remaining part of the channel, means for fastening the projection in the channel, and a ventilator body journalled in the bracket.

11. Mounting means for one end of a pivoted ventilator body comprising a support having an exposed channel, a glass panel having an edge received in a part of said channel, a sealing strip mounted on the glass panel, a cup-like bracket having a part of its wall cut away to accommodate said panel and sealing strip and having a projection positioned in the remaining part of the channel, means for fastening the projection in the channel, and a movable ventilator body journalled in said bracket and having an edge cooperating with said sealing strip.

12. Mounting means for one end of a pivoted ventilator body comprising a support having an exposed channel, a glass panel having an edge received in a part of said channel, a cup-like bracket having a part of its wall cut away to accommodate said panel and having a projection positioned in the remaining part of the channel, means for fastening the projection in the channel, a spring washer positioned in the bracket and cut away to accommodate the glass panel, and a ventilating body projecting into the bracket to bear against the washer and having a journal supported by said projection.

13. In combination, a closure member formed of angularly arranged channeled frame members to provide an opening, a glass panel having edge portions received in the channels of some of said frame members and having an edge terminating in spaced relation with respect to another of said frame members to leave a part of said frame opening free of said glass panel, a trough-shaped ventilator body pivotally connected to the frame members to control the passage of air through the opening in the closure member free of said glass panel, said ventilator body being pivoted about an axis lying in the plane of the glass panel so that its longitudinal edges will cooperate with side faces of the panel when the ventilator body is arranged in different operative positions, and means carried by one edge portion of the ventilator body and adapted to engage the glass panel for holding the said edge of the body slightly spaced from the panel, whereby air passing through said space will be directed over a surface of the glass panel by the ventilator body.

14. A ventilating apparatus for automobiles of the closed body type adapted to prevent the accumulation of steam, frost or the like on the windshield thereof comprising, in combination, an automobile body, a windshield glass panel therefor, a ventilator member disposed adjacent an edge of said shield and being movable about an axis positioned intermediate opposite edges of the same to permit a portion of said member to be arranged inside the body and inclined toward the plane of the shield to form an elongated slot for the admission of air therethrough whereby to cause a stream of air to pass over the inner surface of the glass panel to prevent the accumulation of steam, frost or the like thereon, and means for adjusting the position of said ventilator member whereby to vary the width of the slot.

15. The herein described method of ventilating the interior of a moving automotive vehicle of the closed body type to prevent the accumulation of steam, frost or the like on the surface of the windshield thereof, comprising the steps of causing the admission of air to the interior of the closed vehicle body during its transit by moving a control about an axis positioned intermediate opposite edges of the same and causing its free edge to define a slot, thereby to permit a portion of the air admitted to be discharged against the inner face of the shield whereby the inner face of the shield may be continuously conditioned by the air to prevent the accumulation of steam, frost, or the like thereon and changing the position of the control relative to the shield to vary the width of the slot.

EDWARD L. KRAFT.